3,361,743
OPTIONALLY SUBSTITUTED HYDRAZONES OF 3-OXYGENATED PREGNA-5,17(20)-DIEN-21-ALS
Walter R. Benn, Deerfield, Ill., assignor to G. D. Searle & Co., Chicago, Ill., a corporation of Delaware
No Drawing. Filed June 30, 1966, Ser. No. 561,716
8 Claims. (Cl. 260—239.5)

This application is a continuation-in-part of my co-pending application Ser. No. 540,172, filed Apr. 4, 1966.

The present invention relates to complex hydrazones of steroidal aldehydes and, more particularly, to optionally substituted hydrazones of 3-oxygenated pregn-5,17-(10)-dien-21-als. These novel compounds are represented by the following structural formula

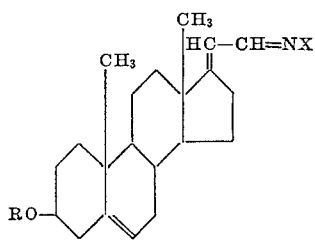

wherein R can be hydrogen or a lower alkanoyl radical and X can be an amino, (lower alkyl)amino, di-(lower alkyl)amino, phenylamino, fluorophenylamino, or 4-substituted piperazino radical.

The lower alkanoyl radicals encompassed by the R term are typified by formyl, acetyl, propionyl, butyryl, valeryl, caproyl, heptanoyl and the branched-chain isomers thereof.

Illustrative of the lower alkyl radicals denoted in the foregoing structural representation are methyl, ethyl, propyl, butyl, pentyl, hexyl, heptyl, and the branched-chain radicals isomeric therewith.

Among the 4-substituted piperazino radicals within the scope of the X term, 4-benzhydrylpiperazino is especially preferred.

The compounds of this invention exhibit pharmacological properties. They are hormonal and anti-hormonal agents, for example, as is evidenced by their anti-inflammatory, anti-anabolic, anti-androgenic and anti-progestational properties. In addition, they are hypocholesterolemic agents in consequence of their ability to reduce blood plasma cholesterol levels. These compounds display also anti-protozoal and anti-fungal properties as indicated by their ability to inhibit the growth of such organisms as *Tetrahymena gelleii* and *Trichophyton mentagrophytes*. They are able, furthermore, to affect the central nervous system.

The compounds of this invention are conveniently manufactured by methods which utilize as starting materials steroidal aldehydes represented by the following structural formula

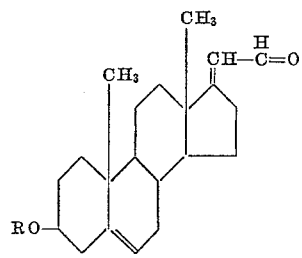

wherein R is hydrogen or a lower alkanoyl radical as defined hereinbefore. Reaction of those aldehydes with the appropriate hydrazine affords the hydrazones of the present invention. That reaction proceeds readily by contacting the reactants in a suitable inert organic solvent. The presence of a catalyst is not required although a small amount of an acid such as acetic or phosphoric can be added. Alternatively, the addition of silica gel serves to remove the water formed. In certain instances, heating of the reaction mixture has been observed to accelerate the reaction. A specific example of this process is the reaction of 3β-acetoxy-pregna-5,17(20)-dien-21-al in benzene with 1,1-dimethylhydrazine in the presence of silica gel to afford 3β-acetoxypregna-5,17(20)-dien-21-al 21-dimethylhydrazone.

An alternate method for the production of the instant 3-hydroxy compounds involves hydrolysis of the corresponding 3-alkanoates. The aforementioned 3β-acetoxy-pregna-5,17(20)-dien-21-al 21-dimethylhydrazone, for example, is heated in methanol with aqueous sodium bicarbonate to yield 3β-hydroxypregna-5,17(20)-dien-21-al 21-dimethylhydrazone.

The invention will appear more fully from the examples which follow. These examples are given by way of illustration only, however, and are not to be construed as limiting the invention either in spirit or in scope as many modifications both in materials and methods will be apparent from these examples to those skilled in the art. In the following examples, temperatures are given in degrees centigrade (° C.), and quantities of materials are expressed in parts by weight except where otherwise noted.

Example 1

To a solution of 3.56 parts of 3β - acetoxypregna-5,17(20) - dien - 21 - al in 70 parts of benzene is added successively 4.7 parts of 1,1 - dimethylhydrazine and 5 parts of silica gel. After stirring at room temperature for about 2 hours, the reaction mixture is filtered and the filter cake is washed with benzene. Evaporation of the solvent under reduced pressure affords the crude product as a slightly gummy solid. Purification of that material from acetone affords pure 3β - acetoxypregna-5,17(20) - dien - 21 - al 21 - dimethylhydrazone, melting at about 163–165°. This material displays an ultraviolet absorption maximum at about 284.5 millimicrons with a molecular extinction coefficient of about 23,700, infrared absorption peaks, in a potassium bromide disc, at about 5.76, 6.39, 8.03, 9.65 and 9.75 microns and nuclear magnetic resonance peaks at about 49, 63, 121, 170, 275, 323, 348, 357, 421 and 431 cycles per second. This compound is represented by the following structural formula

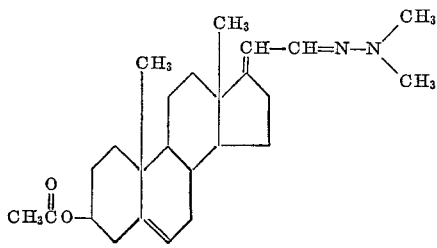

Example 2

When an equivalent quantity of 1,1 - diethyl - hydrazine is substituted in the procedure of Example 1, there is produced 3β - acetoxypregna - 5,17(20) - dien - 21 - al 21 - diethylhydrazone.

Example 3

A mixture containing 3.56 parts of 3β - acetoxypregna-5,17(20) - dien - 21 - al, 10.3 parts of hydrazine hydrate, 0.3 part of glacial acetic acid and 136 parts of isopropyl alcohol is heated at the reflux temperature, under nitrogen, for about one hour, then is partially concentrated under reduced pressure. The product crystallizes from solution and is isolated by filtration, washed on the filter with cold isopropyl alcohol and dried to yield 3β - acetoxypregna - 5,17(20) - dien - 21 - al 21 - hydrazone, melting at about 182–184° with decomposition. It exhibits an ultraviolet absorption maximum about 266 millimicrons with a molecular extinction coefficient of about 21,500, infrared absorption maxima, in a potassium bromide disc, at about 2.94, 3.10, 5.78, 6.10, 6.31, 7.92, 9.56 and 11.40 microns and nuclear magnetic resonance peaks at about 49, 63, 121, 278, 323, 343, 354, 450 and 459 cycles per second. It is represented by the following structural formula

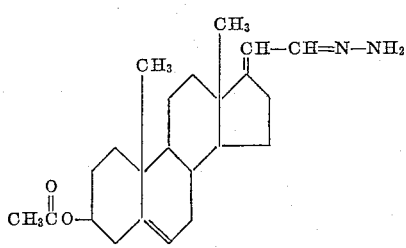

Example 4

When an equivalent quantity of 3β - propionoxypregna - 5,17(20) - dien - 21 - al is substituted in the procedure of Example 3, there is produced 3β - propionoxypregna - 5,17(20) - dien - 21 - al 21 - hydrazone.

Example 5

By substituting an equivalent quantity of 3β - hydroxypregna - 5,17(20) - dien - 21 - al and otherwise proceeding according to the processes described in Example 3, there is obtained 3β - hydroxypregna - 5,17(20) - dien - 21 - al 21 - hydrazone.

Example 6

A solution containing 1.78 parts of 3β - acetoxypregna-5,17(20) - dien - 21 - al, 5 parts by volume of methylhydrazine, 0.2 part of glacial acetic acid and 68 parts of isopropyl alcohol is heated at the reflux temperature, in a nitrogen atmosphere, for about 45 minutes, then is partially concentrated under nitrogen and cooled. The crystalline product which separates as leaflets is isolated by filtration and dried to yield pure 3β - acetoxypregna-5,17 (20) - dien - 21 - al 21 - methylhydrazone, which melts at about 146–149° with decomposition. It displays an optical rotation, in chloroform, of —60°. This compound displays also an ultraviolet absorption maximum at about 275.5 millimicrons with a molecular extinction coefficient of about 20,400, infrared absorption maxima at about 2.95, 5.79, 6.35, 7.94 and 9.69 microns and nuclear magnetic resonance peaks at about 49, 63, 121.5, 173, 278, 324, 346, 356, 440 and 450 cycles per second. It is characterized further by the following structural formula

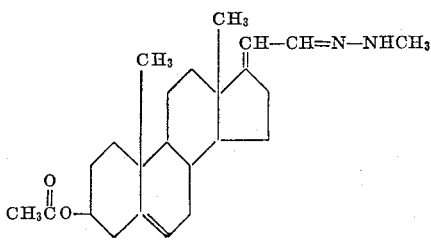

Example 7

When an equivalent quantity of ethylhydrazine is substituted in the procedure of Example 6, there is produced 3β - acetoxypregna - 5,17(20) - dien - 21 - al 21 - ethylhydrazone.

Example 8

A mixture containing one part of 3β-acetoxypregna-5,17(20)-dien-21-al, 1.1 parts of phenylhydrazine, 0.15 part of glacial acetic acid and 40 parts of isopropyl alcohol is heated at the reflux temperature for about 5 minutes, and the precipitate which forms is collected by filtration, then purified by recrystallization, in an atmosphere of nitrogen, from isopropyl alcohol. The resulting light yellow needle-like crystals are isolated by filtration and dried to afford 3β-acetoxypregna-5,17(20)-dien-21-al 21-phenylhydrazone, melting at about 231–240° with decomposition. Infrared absorption maxima, in a potassium bromide disc, are observed at about 3.03, 5.81, 6.07, 6.24, 6.68, 7.90, 9.69 and 13.35 microns. Nuclear magnetic resonance peaks are observed at about 49.5, 62.5, 121.5, 276, 324, 352, 362, 408–436, 448 and 458 cycles per second. This compound is represented by the following structural formula

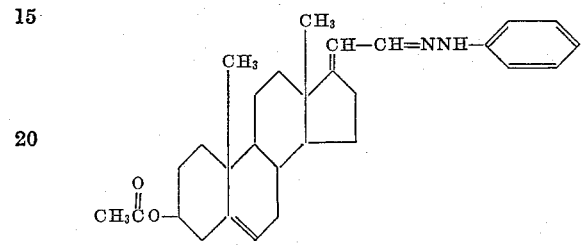

Example 9

A mixture of 0.46 part of p-fluorophenylhydrazine hydrochloride and 0.23 part of sodium acetate with 80 parts of ethanol is filtered then is added to a solution of one part of 3β-acetoxypregna-5,17(20)-dien-21-al in 80 parts of ethanol. The resulting reaction mixture is warmed slightly with vigorous stirring for about one hour. The crude product which separates during the reaction period is isolated by filtration and washed on the filter with cold ethanol. Drying of that material affords pure 3β-acetoxypregna-5,17(20)-dien-21-al 21-p-fluorophenylhydrazone, which melts at about 207–215° with decomposition. It displays infrared absorption maxima at about 245, 310 and 331 millimicrons with molecular extinction coefficients of about 8400, 23,600 and 21,400, respectively. Infrared absorption peaks, in a potassium bromide disc, are displayed at about 3.01, 5.81, 6.00, 6.18, 6.53, 6.63, 7.91, 8.23, 9.74 and 12.09 microns. This compound displays also nuclear magnetic resonance maxima at about 49.5, 62, 122, 275, 324, 349, 358.5, 412, 418, 447 and 457 cycles per second and is further characterized by the following structural formula

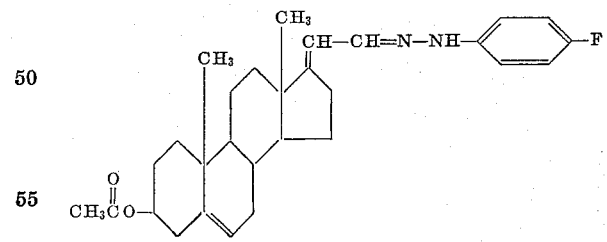

Example 10

A mixture containing 2.36 parts of 3β-acetoxypregna-5,17(20)-dien-21-al, 2 parts of 1-amino-4-benzhydrylpiperazine, 5 parts of silica gel and 44 parts of benzene is stirred at room temperature for about 5 hours. The mixture is then filtered to remove the catalyst, and the filter cake is washed with benzene. The combined filtrates are concentrated under reduced pressure, and the resulting solid crude product is purified by recrystallization from ether-petroleum ether to yield prismatic crystals of 3β - acetoxypregna - 5,17(20)-dien-21-al 21-(1′-amino-4′-benzhydrylpiperazine) hydrazone, melting at about 185–186°. This compound exhibits ultraviolet absorption maxima at about 224 and 283 millimicrons with molecular extinction coefficients of about 16,650 and 25,000, respectively. Infrared absorption peaks, in a potassium bromide disc, are observed at about 3.42, 3.51, 5.75, 6.25, 6.35, 8.04, 8.76, 9.21, 9.71 and 10.07 microns. Nuclear magnetic resonance maxima are displayed at about 49, 62, 121, 255, 275, 323, 348, 358 and 429–452 cycles per second. This compound is represented by the following structural formula

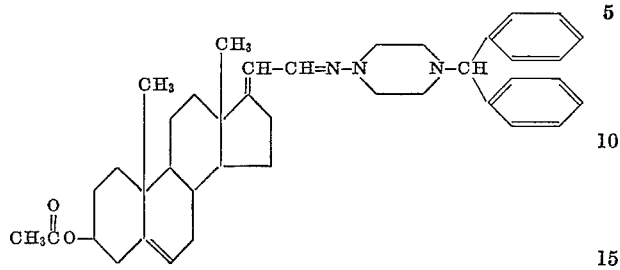

What is claimed is:
1. A compound of the formula

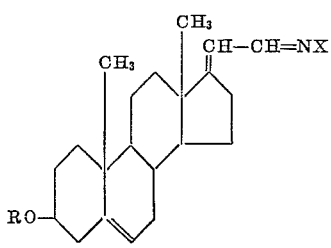

wherein R is selected from the group consisting of hydrogen and a lower alkanoyl radical and X is a member of the class of radicals consisting of amino, (lower alkyl) amino, di - (lower alkyl)amino, phenylamino p - fluorophenylamino and 4-benzhydrylpiperazino.

2. As in claim 1, a compound of the formula

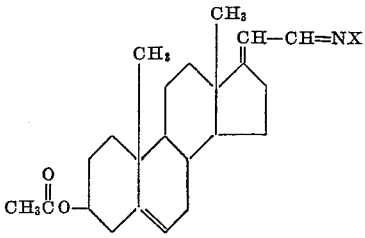

wherein X is a member of the class of radicals consisting of amino, (lower alkyl)amino, di-(lower alkyl)amino, phenylamino, p-fluorophenylamino and 4-benzhydrylpiperazino.

3. As in claim 1, the compound which is 3β-acetoxy-pregna-5,17(20)-dien-21-al 21-dimethylhydrazone.

4. As in claim 1, the compound which is 3β-acetoxy-pregna-5,17(20)-dien-21-al 21-hydrazone.

5. As in claim 1, the compound which is 3β-acetoxy-pregna-5,17(20)-dien-21-al 21 - (1'-amino-4'-benzhydrylpiperazine) hydrazone.

6. As in claim 1, the compound which is 3β-acetoxy-pregna-5,17(20)-dien-21-al 21-methylhydrazone.

7. As in claim 1, the compound which is 3β-acetoxy-pregna-5,17(20)-dien-21-al 21-phenylhydrazone.

8. As in claim 1, the compound which is 3β-acetoxy-pregna-5,17(20)-dien-21-al 21-p-fluorophenylhydrazone.

References Cited
UNITED STATES PATENTS
2,276,654   3/1942   Miescher et al. _____ 260—397.4

LEWIS GOTTS, *Primary Examiner.*

H. FRENCH, *Assistant Examiner.*